US010834167B1

(12) United States Patent
Allen et al.

(10) Patent No.: US 10,834,167 B1
(45) Date of Patent: Nov. 10, 2020

(54) CLIENT SIDE NAVIGATION COMPOSITOR

(75) Inventors: Nicholas A. Allen, Redmond, WA (US); Tres L. Henry, Seattle, WA (US); Elena Dykhno, Redmond, WA (US); David J. Whitney, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 776 days.

(21) Appl. No.: 13/151,915

(22) Filed: Jun. 2, 2011

(51) Int. Cl.
*G06F 15/16* (2006.01)
*H04L 29/08* (2006.01)

(52) U.S. Cl.
CPC .............. *H04L 67/02* (2013.01); *H04L 67/16* (2013.01); *H04L 67/20* (2013.01)

(58) Field of Classification Search
CPC ........... G06F 17/3089; G06F 17/30893; G06F 17/30896; G06F 16/252; G06F 16/955; G06F 16/951; G06F 16/954; H04W 36/06; H04W 36/12; H04W 48/20; H04W 4/50; H04L 67/02; H04L 67/42; H04L 63/0281; H04L 29/06047; H04L 51/14; H04L 61/6013; H04L 67/28; H04L 67/2871; H04L 67/327
See application file for complete search history.

(56) References Cited

U.S. PATENT DOCUMENTS

| | | | | |
|---|---|---|---|---|
| 6,865,593 B1 * | 3/2005 | Reshef | ................ | G06F 17/3061 379/221.09 |
| 7,308,488 B2 * | 12/2007 | Doyle | ................ | G06F 17/3089 707/999.003 |
| 7,533,144 B2 * | 5/2009 | Kassab | ........................ | 709/203 |
| 7,865,544 B2 * | 1/2011 | Kordun | ............... | G06F 17/3089 707/705 |
| 8,041,826 B2 * | 10/2011 | Cammarata | ............. | H04L 63/08 709/219 |
| 8,239,445 B1 * | 8/2012 | Gage | ....................... | H04L 29/06 709/203 |
| 8,645,833 B2 * | 2/2014 | Lin | ................... | G06F 17/30893 715/205 |

(Continued)

OTHER PUBLICATIONS

David Whalen. "The Unofficial Cookie FAQ: Version 2.6" Dated Jun. 8, 2002. Archived May 28, 2010. 11 pages. Available online: http://web.archive.org/web/20100528033903/http://www.cookiecentral.com/faq/.*

(Continued)

*Primary Examiner* — Hitesh Patel
(74) *Attorney, Agent, or Firm* — Davis Wright Tremaine LLP

(57) ABSTRACT

In some embodiments, a system includes a proxy and an application server. The proxy is operable to intercept a request to download application content from an application server, insert an address of a navigation service into the request to yield an augmented request, and transmit the augmented request to the application server. The application server is operable to receive the augmented request, generate an application in response to the augmented request, the application comprising the application content, a navigation placeholder, and code to access the navigation service at the address, the navigation placeholder representing a portion of the application where the navigation service may be inserted, and transmit the application for receipt by the client.

20 Claims, 3 Drawing Sheets

(56) References Cited

U.S. PATENT DOCUMENTS

| | | | | |
|---|---|---|---|---|
| 2004/0054749 | A1* | 3/2004 | Doyle | G06F 17/3089 709/217 |
| 2005/0257141 | A1* | 11/2005 | Brandrud | H04L 29/06 715/248 |
| 2005/0273762 | A1* | 12/2005 | Lesh | 717/115 |
| 2006/0200503 | A1* | 9/2006 | Dosa | G06F 17/30902 |
| 2008/0077983 | A1* | 3/2008 | Meyer et al. | 726/12 |
| 2008/0163260 | A1* | 7/2008 | Lin | G06Q 40/02 719/320 |
| 2008/0227484 | A1* | 9/2008 | Auvray et al. | 455/552.1 |
| 2008/0282329 | A1* | 11/2008 | Shuster | 726/4 |
| 2009/0006523 | A1* | 1/2009 | Kordun | G06F 17/3089 709/202 |
| 2009/0144422 | A1* | 6/2009 | Chatley et al. | 709/226 |
| 2009/0157888 | A1* | 6/2009 | Demmer | H04L 67/22 709/229 |
| 2009/0177761 | A1* | 7/2009 | Meyer | H04L 67/2819 709/219 |
| 2009/0193129 | A1* | 7/2009 | Agarwal | H04L 63/0281 709/229 |
| 2009/0234972 | A1* | 9/2009 | Raghu et al. | 709/246 |
| 2009/0254952 | A1* | 10/2009 | Sridhar | H04L 41/5012 725/92 |
| 2009/0287836 | A1* | 11/2009 | Cammarata | H04L 63/08 709/229 |
| 2010/0082771 | A1* | 4/2010 | Wood et al. | 709/219 |
| 2010/0082813 | A1* | 4/2010 | Li et al. | 709/226 |
| 2010/0257399 | A1* | 10/2010 | Brown | H04L 67/1095 714/4.1 |
| 2011/0222549 | A1* | 9/2011 | Connelly | H04L 12/2836 370/401 |
| 2012/0030341 | A1* | 2/2012 | Jensen et al. | 709/224 |

OTHER PUBLICATIONS

Stuart, et al. "Caching of 'semi' dynamic JavaScript (IIS, ASP, IE6)." Dated Jul. 23 '05. Archived Feb. 25, 2010. 6 pages. Available online: http://web.archive.org/web/20100225121907/http://bytes.com/topic/javascript/answers/148256-caching-semi-dynamic-javascript-iis-asp-ie6.*

Dave Shea. "CSS Sprites2—It's JavaScript Time" Dated Aug. 26, 2008. 40 pages. Available online: http://alistapart.com/article/sprites2.*

Ralf S. Engelschall. "URL Rewriting Guide." Dated 2009. Archived May 28, 2010. 26 pages. Available online: http://web.archive.org/web/20100528031046/http://httpd.apache.org/docs/2.0/misc/rewriteguide.html.*

"API: get YAHOO.util.Get (YUI Library)" Published by Yahoo! Inc. Dated 2008. Archived Dec. 29, 2008. 3 pages. Available online: http://web.archive.org/web/20081229181424/http://developer.yahoo.com/yui/docs/YAHOO.util.Get.html.*

Scott Mitchell. "Role-Based Authorization (C#)". Dated Mar. 24, 2008. 18 pages. Available online: http://www.asp.net/web-forms/tutorials/security/roles/role-based-authorization-cs.*

Tadachika Ozono and Toramatsu Shintani. "An Online Method for Editing Any Web Page Using Proxy Agents". In "IJCSNS International Journal of Computer Science and Network Security". vol. 6 No. 5B, May 2006. pp. 166-172.*

Anne van Kesteren. "Cross-Origin Resource Sharing", W3C Working Draft Jul. 27, 2010. 26 printed pages.*

Refsnes. "PHP—AJAX and MySQL: Example". Archived May 22, 2010. 3 printed pages. Available online: https://web.archive.org/web/20100522012600/http://www.w3schools.com/php/php_ajax_database.*

Debra Chamra. "Progressive Enhancement: Paving the Way for Future Web Design." Triangle Tech Journal, Mar. 2004. Archived Mar. 27, 2004. 3 printed pages. Available online: https://web.archive.org/web/20040327131528/http://triangletechjournal.com/news/article.html?item_id=140.*

Jeremy Keith. "Hijax". DOMscripting. Dated Jan. 1, 2006. Archived May 28, 2010. 5 printed pages. Available online: https://web.archive.org/web/20100528092414/http://domscripting.com/blog/display/41.*

Michal Zalewski. "Browser Security Handbook, part 2". Dated Jan. 22, 2010, archived Feb. 23, 2010. 29 printed pages. Available online: https://web.archive.org/web/20100223055641/http://code.google.com/p/browsersec/wiki/Part2.*

Refsnes. "AJAX Introduction." Archived May 22, 2010. 3 printed pages. Available online: https://web.archive.org/web/20100522012815/http://www.w3schools.com/php/php_ajax_intro.asp.*

* cited by examiner

CLIENT SIDE NAVIGATION COMPOSITOR

BACKGROUND

A web application is an application that is accessed over a network such as the Internet or an intranet. In some examples, web applications may be hosted in a browser-controlled environment (such as a Java applet) or coded in a browser-supported language (such as JavaScript, combined with a browser-rendered markup language like HTML) and reliant on a common web browser to render the application executable.

As web applications become more complex and incorporate increasingly diverse functionality, the cost of maintaining the web application as a single unit grows larger. Developers may respond to these increasing costs by factoring the application into multiple, smaller pieces that can be stitched together to provide functionality equivalent to the original application.

DETAILED DESCRIPTION

A web application is an application that is accessed over a network such as the Internet or an intranet. In some examples, web applications may be hosted in a browser-controlled environment (such as a Java applet) or coded in a browser-supported language (such as JavaScript, combined with a browser-rendered markup language like HTML) and reliant on a common web browser to render the application executable.

As web applications become more complex and incorporate increasingly diverse functionality, the cost of maintaining the web application as a single unit grows larger. Developers may respond to these increasing costs by factoring the application into multiple, smaller pieces that can be stitched together to provide functionality equivalent to the original application. For example, a single application may be divided into multiple pages or parts, and a navigation mechanism may be provided to allow a user to move between different pages or parts. Factoring the application into smaller pieces, however, may introduce a new problem of maintaining a coordinated look-and-feel to give the illusion of a single application.

A variety of techniques may be applied at an application server to maintain navigation consistency between pieces of an application. One example approach may include incorporating a shared code library into each page of an application to provide a consistent navigation mechanism between pages. This approach, however, may require each page of the application to be updated simultaneously to maintain consistency when the navigation mechanism changes. Another example approach to maintain navigation consistency between pieces of an application may include modifying the application pages with server-side transformations that incorporate the navigation mechanism prior to serving the application to a client. In other words, an application server may stitch together smaller pieces of an application prior to serving the application to the client. This approach, however, may reduce the control that each part of an application has over its rendering and may necessitate increased testing of updates.

Certain embodiments recognize the capability to maintain navigation consistency between pieces of an application by inserting navigation mechanisms at the client rather than at the server. Certain embodiments recognize that deferring insertion of navigation mechanisms until the application is processed by the client may reduce costs associated with updating pages or parts of an application. Certain embodiments recognize that client-side approaches may reduce testing associated with updates to an application.

Figure 1:
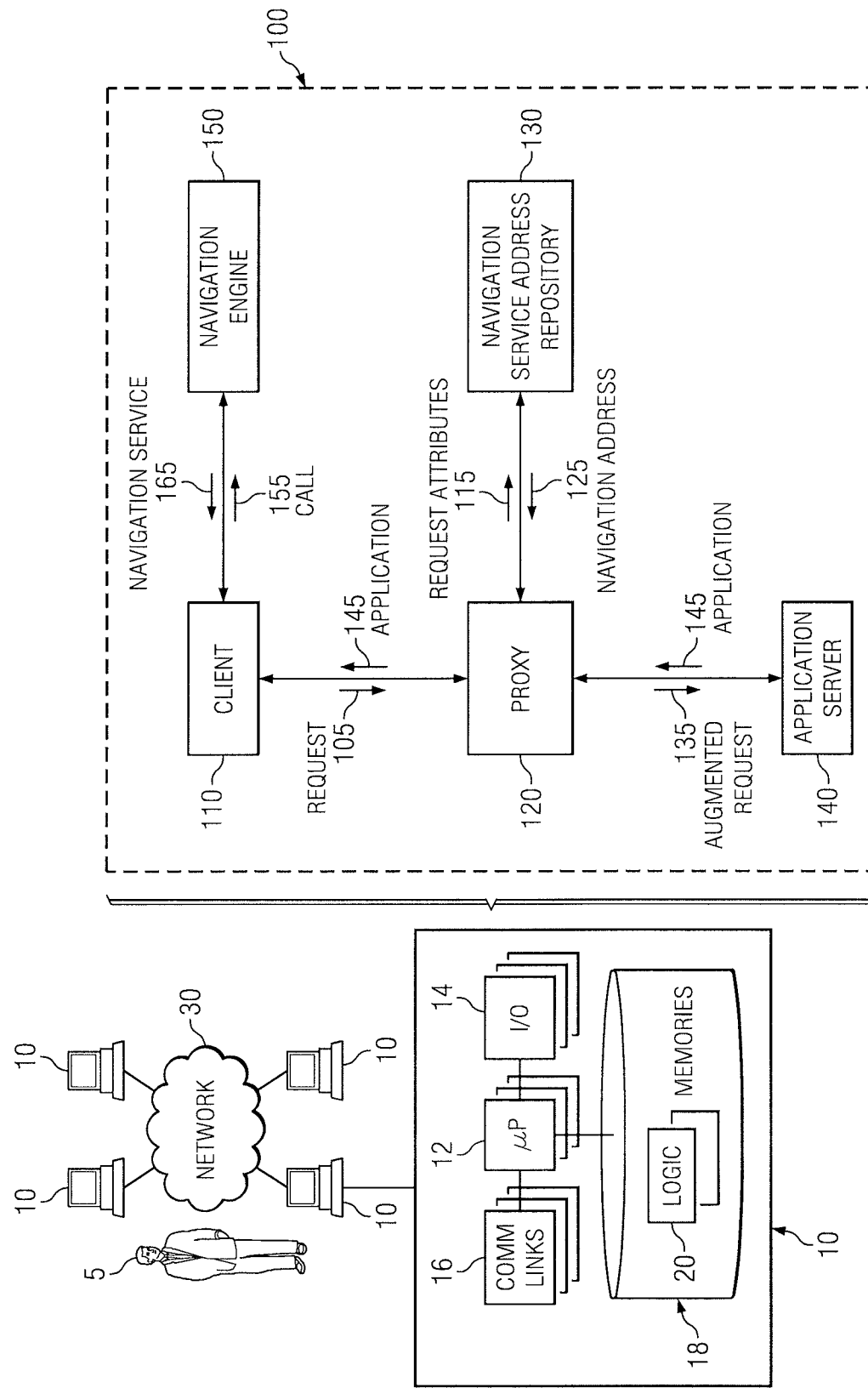
FIG. 1 shows an example navigation composition system according to one embodiment.

FIG. 1 shows navigation composition system 100 according to one embodiment. The navigation composition system 100 of FIG. 1 features a client 110, a proxy 120, a navigation service address repository 130, an application server 140, and a navigation engine 150, that may be implemented by one or more computer systems 10.

Users 5 may access navigation composition system 100 through computer systems 10. Users 5 may include any individual, group of individuals, entity, machine, and/or mechanism that interacts with computer systems 10.

Computer system 10 may include processors 12, input/output devices 14, communications links 16, and memory 18. In other embodiments, computer system 10 may include more, less, or other components. Computer system 10 may be operable to perform one or more operations of various embodiments. Although the embodiment shown provides one example of computer system 10 that may be used with other embodiments, such other embodiments may utilize computers other than computer system 10. Additionally, embodiments may also employ multiple computer systems 10 or other computers networked together in one or more public and/or private computer networks, such as one or more networks 30.

Processors 12 represent devices operable to execute logic contained within a medium. Examples of processor 12 include one or more microprocessors, one or more applications, and/or other logic. Computer system 10 may include one or multiple processors 12.

Input/output devices 14 may include any device or interface operable to enable communication between computer system 10 and external components, including communication with a user or another system. Example input/output devices 14 may include, but are not limited to, a mouse, keyboard, display, and printer.

Network interfaces 16 are operable to facilitate communication between computer system 10 and another element of a network, such as other computer systems 10. Network interfaces 16 may connect to any number and combination of wireline and/or wireless networks suitable for data transmission, including transmission of communications. Network interfaces 16 may, for example, communicate audio and/or video signals, messages, internet protocol packets, frame relay frames, asynchronous transfer mode cells, and/or other suitable data between network addresses. Network interfaces 16 connect to a computer network or a variety of other communicative platforms including, but not limited to, a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

Memory 18 represents any suitable storage mechanism and may store any data for use by computer system 10. Memory 18 may comprise one or more tangible, computer-readable, and/or computer-executable storage medium. Examples of memory 18 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, memory 18 stores logic 20. Logic 20 facilitates operation of computer system 10. Logic 20 may include hardware, software, and/or other logic. Logic 20 may be encoded in one or more tangible, non-transitory media and may perform operations when executed by a computer. Logic 20 may include a computer program, software, computer executable instructions, and/or instructions capable of being executed by computer system 10. Example logic 20 may include any of the well-known OS2, UNIX, Mac-OS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. Logic 20 may also be embedded within any other suitable medium without departing from the scope of the invention.

Various communications between computers 10 or components of computers 10 may occur across a network, such as network 30. Network 30 may represent any number and combination of wireline and/or wireless networks suitable for data transmission. Network 30 may, for example, communicate internet protocol packets, frame relay frames, asynchronous transfer mode cells, and/or other suitable data between network addresses. Network 30 may include a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable communication links; or any combination of the preceding. Although the illustrated embodiment shows one network 30, teachings of certain embodiments recognize that more or fewer networks may be used and that not all elements may communicate via a network. Teachings of certain embodiments also recognize that communications over a network is one example of a mechanism for communicating between parties, and any suitable mechanism may be used.

Client 110 provides an interface for user 5 to request and receive applications. In some embodiments, client 110 may request applications on behalf of user 5, execute application code, and/or display interface controls to user 5. One example of client 110 may include a web browser operable to render a web application.

Proxy 120 is an intermediary node between client 110 and application server 140. In one example embodiment, proxy 120 is a proxy server that intercepts requests 105 from client 110. Request 105 represents a request to download application content from application server 140. In some embodiments, request 105 is directed to application server 140 by client 110. For example, request 105 may include an address of application content on application server 140. In some embodiments, this address may take the form of a web address, such as a uniform resource locator (URL) path. In this example, proxy 120 may intercept request 105 even though request 105 may be addressed to application server 140.

Navigation service address repository 130 stores navigation addresses 125. A navigation address 125 may identify the location of a navigation service 165. A navigation service 165 provides a user interface to user 5.

One example of a navigation service 165 may include a navigation user interface that allows user 5 to navigate between different pages or pieces of an application. For example, navigation service 165 may include chrome that provides navigational elements around application content. For example, navigation service 165 may include menus and links that allows user 5 to navigate to different application content.

Navigation service address repository 130 may select a navigation address 125 from among the stored navigation addresses that may be ultimately used by client 110 to locate navigation service 165, as will be explained in greater detail below. In some embodiments, a navigation service 165 may include non-navigation controls in addition to or in place of navigation mechanisms. For example, navigation service 165 may provide an interface to allow user 5 to perform actions without navigating to a different page or piece of an application.

Application server 140 generates, stores, and/or provides applications 145. Application 145 may include any computer program that allows a user such as user 5 to request, receive, and/or manipulate information. One example of application 145 may include a web application. A web application is an application that is accessed over a network such as the Internet or an intranet.

In some embodiments, application 145 includes application content, a navigation placeholder, and code to access navigation service 165. Application content may include text, images, and other resources that provide information to user 5 when read or otherwise consumed. Navigation placeholder may represent a portion of application 145 where a navigation service 165 may be inserted. Code to access navigation service 165 may include instructions to client 110 to retrieve a navigation service 165 from navigation engine 150. In some embodiments, code to access navigation service 165 may include navigation address 125. In one example embodiment, code to access navigation service 165 includes a JavaScript script configured to locate the navigation placeholder and overwrite the navigation placeholder with the navigation service 165. In some embodiments, the code to access navigation service 165 may leave the navigation placeholder intact and insert the navigation service 165 at the navigation placeholder.

In the example of FIG. 1, one client 110, one proxy 120, one navigation service address repository 130, one application server 140, and one navigation engine 150 are shown. However, teachings of certain embodiments recognize that each component of system 100 may include multiple components. As one example, a single proxy 120 may direct augmented requests 135 to multiple application servers 140. As another example, multiple proxies 120 may access a single navigation service address repository 130. As yet another example, a single navigation engine 150 may provide navigation services 165 to multiple clients 110 and for multiple applications 145 provided by multiple application servers 140. In this last example, a single navigation engine 150 may provide navigation services 165 for a variety of enterprises and applications.

In operation, according to one example embodiment, client 110 issues a request 105. Request 105 represents a request to download application content from application server 140. Client 110 directs request 105 to application sever 140, which hosts the requested application. In this example embodiment, however, proxy 120 intercepts request 105.

In response to intercepting request 105, proxy 120 may acquire a navigation address 125. Navigation address 125 identifies the location of a navigation service 165. In some embodiments, proxy 120 acquires navigation address 125 by transmitting one or more request attributes 115 to navigation service address repository 130. Request attributes 115 may identify one or more characteristics of request 105 and may differentiate request 105 from other requests or classes of requests.

In one example embodiment, request attributes 115 may be based on an address of application content specified in request 105. For example, different types of application content may have different navigation controls, and navigation service address repository 130 may use request attribute 115 to identify a navigation service 165 that has the correct navigation controls. As one example, request 105 may specify a URL path for application content stored on application server 140, and navigation service address repository 130 may identify a navigation service 165 corresponding to the URL path.

In another example embodiment, request attributes 115 may be based on an authentication status of user 5. For example, a user may be either authenticated or not authenticated, and authenticated users may be entitled to different navigation controls than non-authenticated users. In some embodiments, client 110 may include a mechanism allowing user 5 to log in and become an authenticated user. In some embodiments, authenticated users may be separated into different categories or tiers, with each category or tier of user being entitled to different navigation controls.

In another example embodiment, request attributes 115 may be based on an authorization status of user 5. For example, even if a user is authenticated, the user may not have sufficient rights to navigate to certain content. Accordingly, navigation service address repository 130 may identify a navigation service 165 that allows user 5 to navigate to authorized content while not providing user 5 the ability to navigate to unauthorized content.

In another example embodiment, request attributes 115 may be based on a version token. For example, different clients and/or users may be picked to receive different versions of applications 145. For example, applications 145 may be updated from time to time, but clients 110 may not be compatible with updated applications 145. In this example, navigation service address repository 130 may identify a navigation service 165 compatible with the old version. As another example, client 110 may be a slim client that does not have the local software and/or processor power to render some applications 145. In this example, navigation service address repository 130 may identify a navigation service 165 compatible with the capabilities of a slim client.

In response to receiving request attributes 115, navigation service address repository 130 may select addresses 125 for one or more navigation services 165. A navigation address 125 may identify the location of a navigation service 165. Navigation service address repository 130 may return the selected addresses 125 in response to request attributes 115.

Upon receiving addresses 125 from navigation service address repository 130, proxy 120 may insert addresses 125 into request 105 to yield augmented request 135. In some embodiments, augmented request 135 may be a hypertext transfer protocol (HTTP) request. In these embodiments, proxy 120 may insert address 125 into augmented request 135 by inserting address 125 into an HTTP header or an HTTP cookie.

Proxy 120 may then transmit augmented request 135 to application server 140. In some embodiments, proxy 120 may determine the address of application server 140 according to a routing table. For example, in one embodiment, request 105 may specify the address of application content, and proxy 120 may use this address to look up the address of the application server 140 hosting the application content.

Application server 140 may receive augmented request 135 and generate application 145. In this example, application 145 includes application content, a navigation placeholder, and code to access navigation service 165. In some embodiments, application 145 may also include a fallback navigation service. In some embodiments, application 145 may include instructions to insert a fallback navigation service into application 145 instead of navigation service 165 if navigation engine 150 does not provide navigation service 165 in a timely manner. In some embodiments, fallback navigation services will be described in greater detail with regard to FIGS. 2A-2C.

Application server 140 may transmit application 145 to client 110. In some embodiments, application server 140 transmits application 145 to client 110 through proxy 120. Client 110, upon receiving application 145, may execute the code to access the navigation service 165 at navigation address 125. In this example, the code to access the navigation service 165, when executed, transmits a call 155 to navigation engine 150 requesting navigation service 165. Navigation engine 150 may provide the requested navigation service 165 in response to call 155.

Client 110, upon receiving navigation service 165, may insert navigation service 165 into application 145 at or in place of the navigation placeholder. In one example embodiment, navigation engine 150 provides code that modifies the object model of application 145 to replace the navigation placeholder with navigation service 165. For example, navigation engine 150 may provide a JavaScript script that locates the navigation placeholder in application 145 and overwrites the navigation placeholder with the navigation service 165.

Teachings of certain embodiments recognize that inserting navigation service 165 at client 110 rather than at application server 140 may reduce costs associated with updating pages or parts of an application. For example, certain embodiments recognize that client-side approaches may reduce testing associated with updates to application 145. Teachings of certain embodiments also recognize that inserting navigation mechanisms at client 110 may allow system 100 to maintain navigation consistency between pieces of application 145.

Figure 2A:
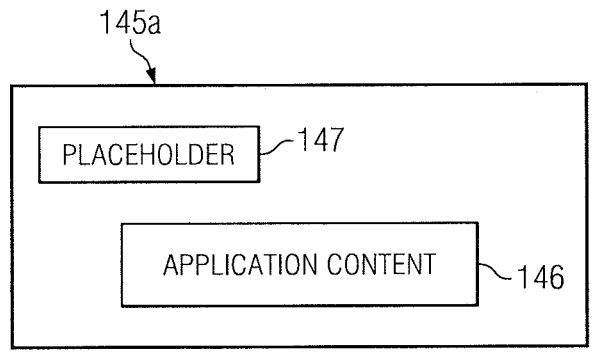
FIGS. 2A, 2B, and 2C show variations of application 145 of FIG. 1 according to several embodiments.
Figure 2B:
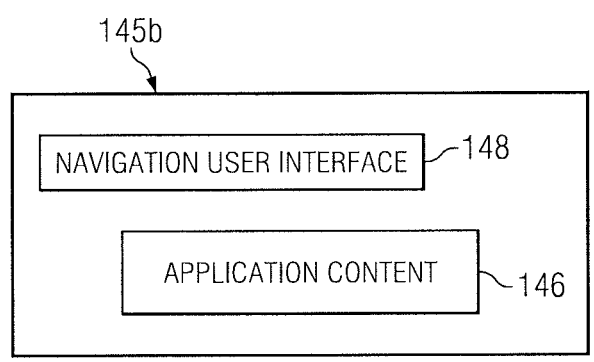
Figure 2C:
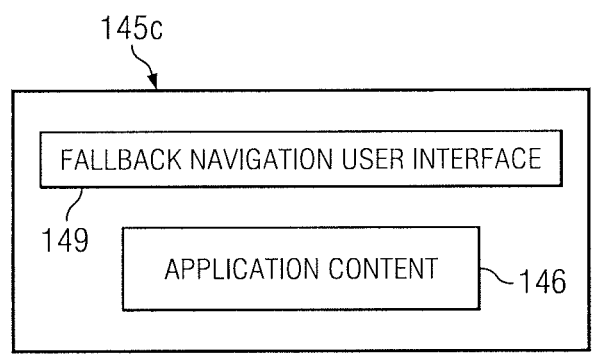

FIGS. 2A, 2B, and 2C show variations of application 145 of FIG. 1 according to several embodiments.

FIG. 2A shows an application 145a having application content 146 and a placeholder 147. Application content 146 may include text, images, and other resources that provide information to user 5 when read or otherwise consumed. Placeholder 147 may represent a portion of application 145a where a navigation service 165 may be inserted. In some embodiments, application 145a may resemble a version of application 145 prior to execution of code to access navigation service 165.

FIG. 2B shows an application 145b having application content and a navigation user interface 148. In this example embodiment, navigation user interface 148 is an example of navigation service 165 that allows user 5 to navigate between different pages or pieces of application 145b. In some embodiments, application 145b may resemble a version of application 145 after execution of code to access navigation service 165.

In some circumstances, client 110 and/or navigation engine 150 may become slow or unresponsive. For example, client 110 may be unable to execute code to access navigation service 165, or navigation engine 150 may be unable to provide navigation service 165 in a timely manner. Accordingly, teachings of certain embodiments recognize the capability to provide fallback navigation services that may be inserted into an application if navigation services 165 from navigation engine 150 are unavailable.

FIG. 2C shows an application 145c having application content and a fallback navigation user interface 149. In some embodiments, application 145c may resemble a version of application 145 after execution of code to access navigation service 165 revealed that navigation engine 150 is slow or unresponsive. For example, application 145 may include code instructing client 110 to render fallback navigation user interface 149 if navigation engine 150 is slow or unresponsive.

In some embodiments, fallback navigation user interface 149 may represent a slimmer or simpler version of navigation user interface 148. For example, in one embodiment, navigation user interface 148 may include JavaScript elements, whereas fallback navigation user interface 149 may be a textual representation of navigation user interface 148 that does not require the use of JavaScript.

In some embodiments, application 145a may be rendered on client 110 with placeholder 147, which may be switched to either navigation user interface 148 or fallback navigation user interface 149 depending on whether the navigation service 165 from navigation engine 150 is available. In other embodiments, application 145c with fallback navigation user interface 149 is rendered first and then switched to navigation user interface 148 when navigation service 165 is received from navigation engine 150.

In one example embodiment, navigation user interface 148 may be received by client 110 after fallback navigation user interface 149 is rendered. In this example, client 110 may wait to render navigation user interface 148 for a period of time. For example, if fallback navigation user interface 149 is displayed, client 110 may delay displaying navigation user interface 148 until at least 1 second has elapsed after displaying fallback navigation user interface 149. Teachings of certain embodiments recognize that waiting to render navigation user interface 148 may reduce the perception of flicker in drawing the successive displays.

Figure 3:
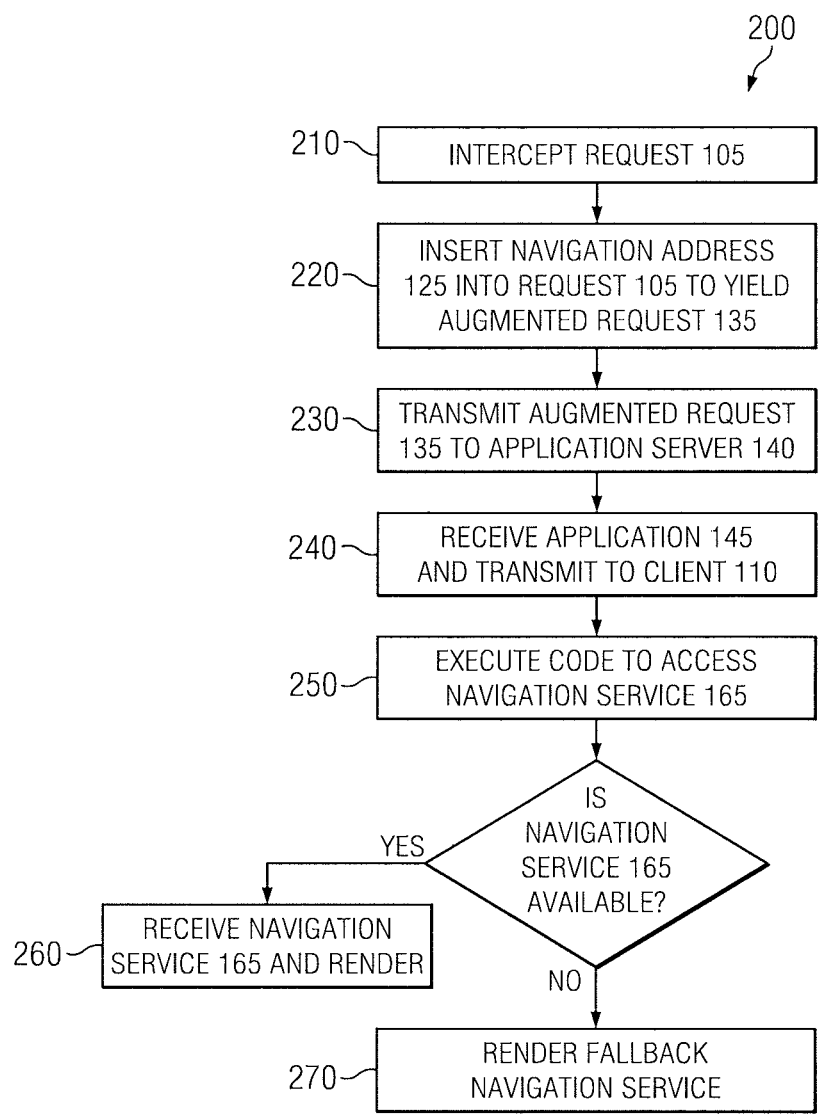
FIG. 3 shows an example method of providing an application with a navigation service to a client according to one embodiment.

FIG. 3 shows an example method 200 of providing application 145 to client 110 according to one embodiment. At step 210, proxy 120 intercepts request 105. At step 220, proxy 210 inserts navigation address 125 into request 105 to yield augmented request 135. At step 230, proxy 120 transmits augmented request 135 to application server 140. At step 240, proxy 120 receives application 145 from application server 140 and transmits application 145 to client 110.

At step 250, client 110 executes code to access navigation service 165. If navigation service 165 is available, client 110 receives navigation service 165 from navigation engine 150 and renders navigation service 165 to user 5 at step 260. If navigation service 165 is unavailable, client 110 renders a fallback navigation service to user 5 at step 270.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A system comprising:
   memory to store instructions, as a result of being executed by one or more processors, cause the system to at least:
   intercept a request, submitted by a client, to download application content from an application server;
   identify, based at least in part on attributes associated with the request, a first service that provides a user interface for navigation between different portions of the application content, wherein the attributes comprise an address for the application content, authentication status of the client, authorization status of the client, and a version token;
   generate an augmented request by at least inserting executable code to access the first service into the request;
   transmit the augmented request to the application server;
   obtain an application in response to the augmented request, wherein the application is modified to comprise a portion of the application content and the executable code to access the first service; and
   retrieve, based at least in part on the augmented request, the application content by executing code for a second service as a result of the executable code to access the first service being unable to access the first service within a predetermined amount of time, wherein executable code for the second service is inserted into a portion of the application originally intended for the first service and provides a second user interface for the application, wherein the portion of the application comprises a navigation placeholder that accepts insertion of the executable code.

2. The system of claim 1, wherein the navigation placeholder accepts insertion of the executable code to access the first service or an address for the second service.

3. The system of claim 1, wherein the application is a web application.

4. The system of claim 1, further comprising a service address repository to store a plurality of navigation service addresses identifying locations associated with the application content.

5. The system of claim 1, wherein the augmented request is transmitted to the application server by identifying an address of the application server according to a routing table comprising one or more addresses of a plurality of application servers hosting the application content.

6. The system of claim 1, wherein the second service provides a user interface that is a textual representation of the first service.

7. The system of claim 1, wherein the first service provides a navigation user interface for the application associated with the application content.

8. The system of claim 4, wherein a navigation service address identifying a location associated with the application content is obtained, based at least in part on the attributes associated with the request, from the service address repository.

9. A method comprising:
intercepting a request, submitted by a client, to download application content from an application server;
identifying, based at least in part on attributes associated with the request, a first service associated with the application content, wherein the attributes comprise an address for the application content, authentication status of the client, authorization status of the client, and a version token;
generating an augmented request by at least inserting executable code usable to access the first service into the request;
transmitting the augmented request to the application server;
obtaining an application in response to the augmented request, wherein the application is modified to comprise a portion of the application content and the executable code usable to access the first service; and
retrieving, based at least in part on the augmented request, the application content by executing code to access a second service as a result of the executable code usable to access the first service being unable to access the first service within a predetermined amount of time, wherein executable code for the second service is inserted into a portion of the application originally intended for the first service and provides a second user interface for the application, wherein the portion of the application comprises a navigation placeholder that accepts insertion of the executable code.

10. The method of claim 9, wherein the augmented request is a hypertext transfer protocol (HTTP) request.

11. The method of claim 9, wherein the navigation placeholder accepts insertion of the executable code to access the first service or an address to access the second service.

12. The method of claim 9, wherein the application is a web application.

13. The method of claim 9, further comprising a service address repository to store a plurality of navigation service addresses identifying locations associated with the application content.

14. The method of claim 9, wherein the second service provides a user interface that is a textual representation of the first service.

15. The method of claim 9, wherein the first service provides a navigation user interface for the application associated with the application content.

16. A non-transitory computer readable medium comprising instructions that, as a result of being executed by one or more processors of a computer system, cause the computer system to at least:
intercept a request, submitted by a client, to download application content from an application server;
identify, based at least in part on attributes associated with the request, a plurality of navigation service addresses identifying locations associated with the applicant content, wherein the attributes comprise an address for the application content, authentication status of the client, authorization status of the client, and a version token;
generate an augmented request by at least inserting executable code to access a first navigation service address of the plurality of navigation service addresses into the request;
transmit the augmented request to the application server;
obtain an application in response to the augmented request, wherein the application is modified to comprise a portion of the application content and the executable code to access the first navigation service address; and
retrieve, based at least in part on the augmented request, the application content by executing code for a second navigation service address as a result of the executable code to access the first navigation service address being unable to access the first navigation service address within a predetermined amount of time, wherein executable code for the second navigation service address is inserted into a portion of the application originally intended for the first navigation service address and provides a user interface for the application, wherein the portion of the application comprises a navigation placeholder that accepts insertion of the executable code.

17. The non-transitory computer readable medium of claim 16, wherein the plurality of navigation service addresses identifying locations associated with the application content are stored in a service address repository.

18. The non-transitory computer readable medium of claim 16, wherein the application is a web application.

19. The non-transitory computer readable medium of claim 16, wherein the navigation placeholder accepts insertion of a first service or a second service.

20. The non-transitory computer readable medium of claim 19, wherein the first service provides a navigation user interface for the application associated with the application content.

* * * * *